Figures 1, 2:
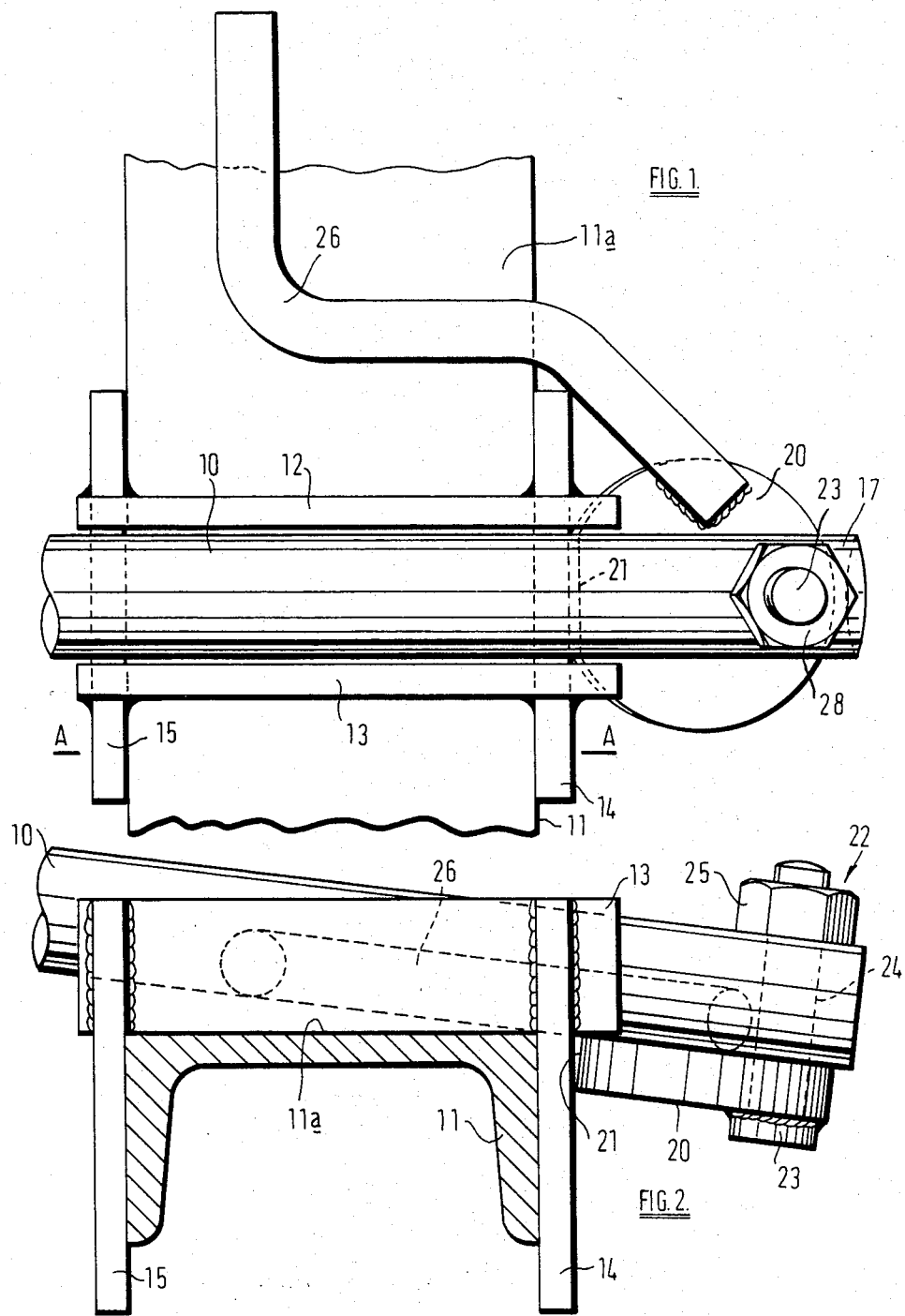

United States Patent [19]

Wooldridge

[11] Patent Number: 4,496,043
[45] Date of Patent: Jan. 29, 1985

[54] SUPPORTING ASSEMBLY FOR TROUGHING ROLLS OF CONVEYOR BELTS

[75] Inventor: Lawson C. Wooldridge, Stourbridge, England

[73] Assignee: Brockway Engineering Company Limited, United Kingdom

[21] Appl. No.: 414,375
[22] PCT Filed: Jan. 13, 1982
[86] PCT No.: PCT/GB82/00007
 § 371 Date: Aug. 27, 1982
 § 102(e) Date: Aug. 27, 1982
[87] PCT Pub. No.: WO82/02374
 PCT Pub. Date: Jul. 22, 1982

[30] Foreign Application Priority Data

Jan. 13, 1981 [GB] United Kingdom ............... 8100963

[51] Int. Cl.³ .............................................. B65G 15/08
[52] U.S. Cl. .................................................... 198/827
[58] Field of Search .............................. 198/826, 827

[56] References Cited

U.S. PATENT DOCUMENTS 1,530,499  3/1925  Knode ................................. 198/826
4,043,447  8/1977  Donnelly et al. ..................... 198/827
4,134,488  1/1979  Bigney ................................. 198/827

FOREIGN PATENT DOCUMENTS 1228187  11/1966  Fed. Rep. of Germany ...... 198/827
 150585   9/1981  Fed. Rep. of Germany ...... 198/827

Primary Examiner—Joseph E. Valenza
Assistant Examiner—Dennis Williamson
Attorney, Agent, or Firm—Kenway & Jenney

[57] ABSTRACT

Described is a conveyor idler roller assembly including an outer roller (1) carried in a conveyor frame (11) on a shaft (10) extending outwardly therefrom, said shaft having pivotally mounted at the free end thereof a disc (20) the plane of which is parallel to the shaft axis and the axis of the mounting (23) at right angles to said shaft axis, said mounting being on a diameter of the disc (20) remote from the center thereof and said disc further including a flat surface portion (21) parallel to a diameter and at right angles to the axis of said pivotal mounting, whereby when the flat portion (21) of said disc co-operates with said frame (11) the idle roller assembly provides support for a conveyor belt (18) and when said disc is rotated about said mounting to move said flat portion remote from said frame the idler roller assembly ceases to provide support for said conveyor belt (18).

4 Claims, 5 Drawing Figures

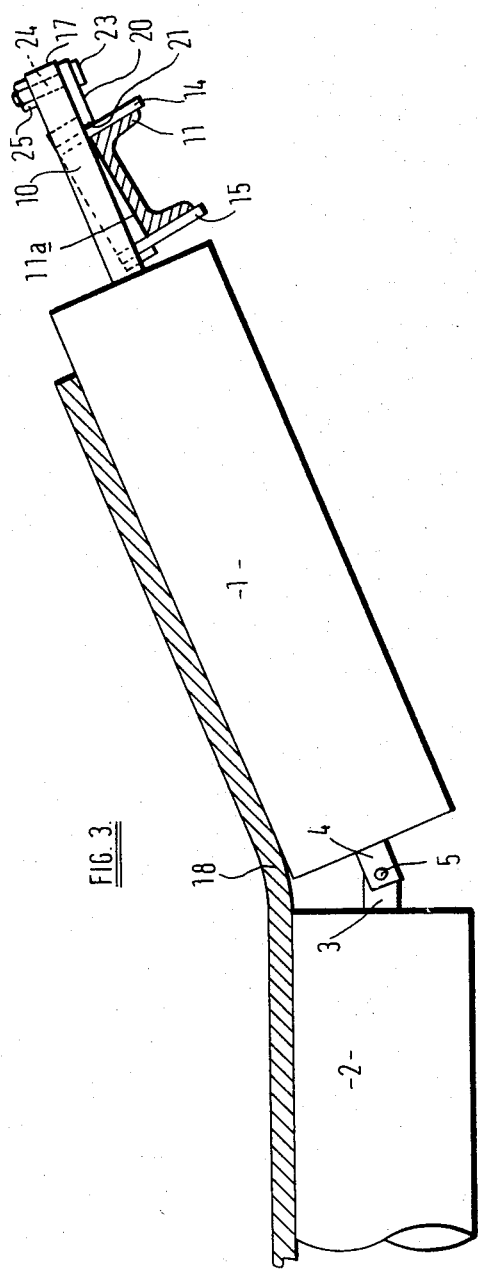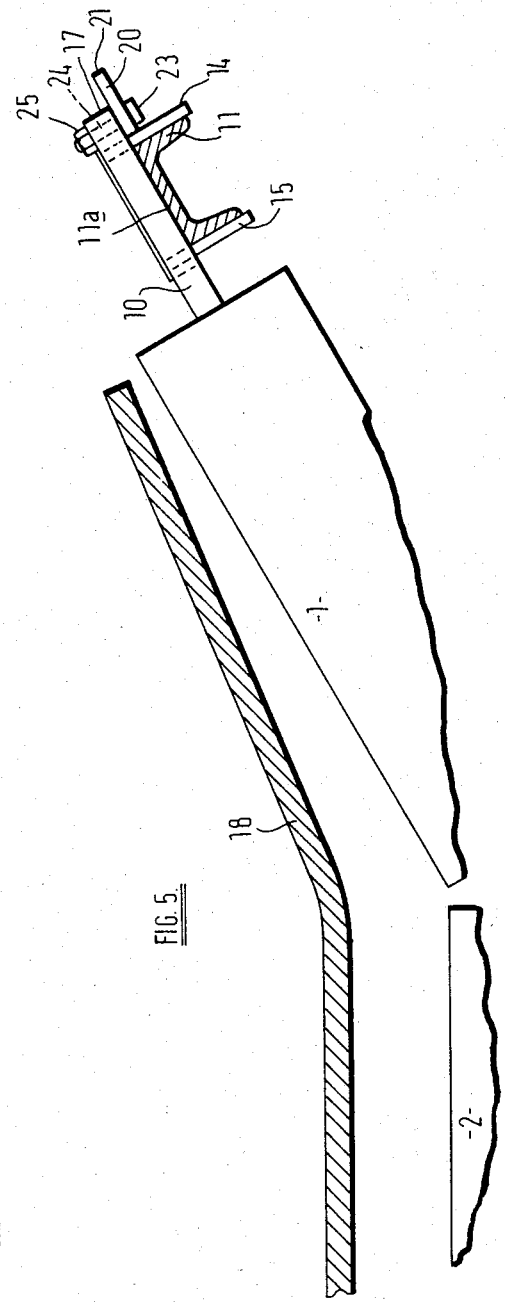

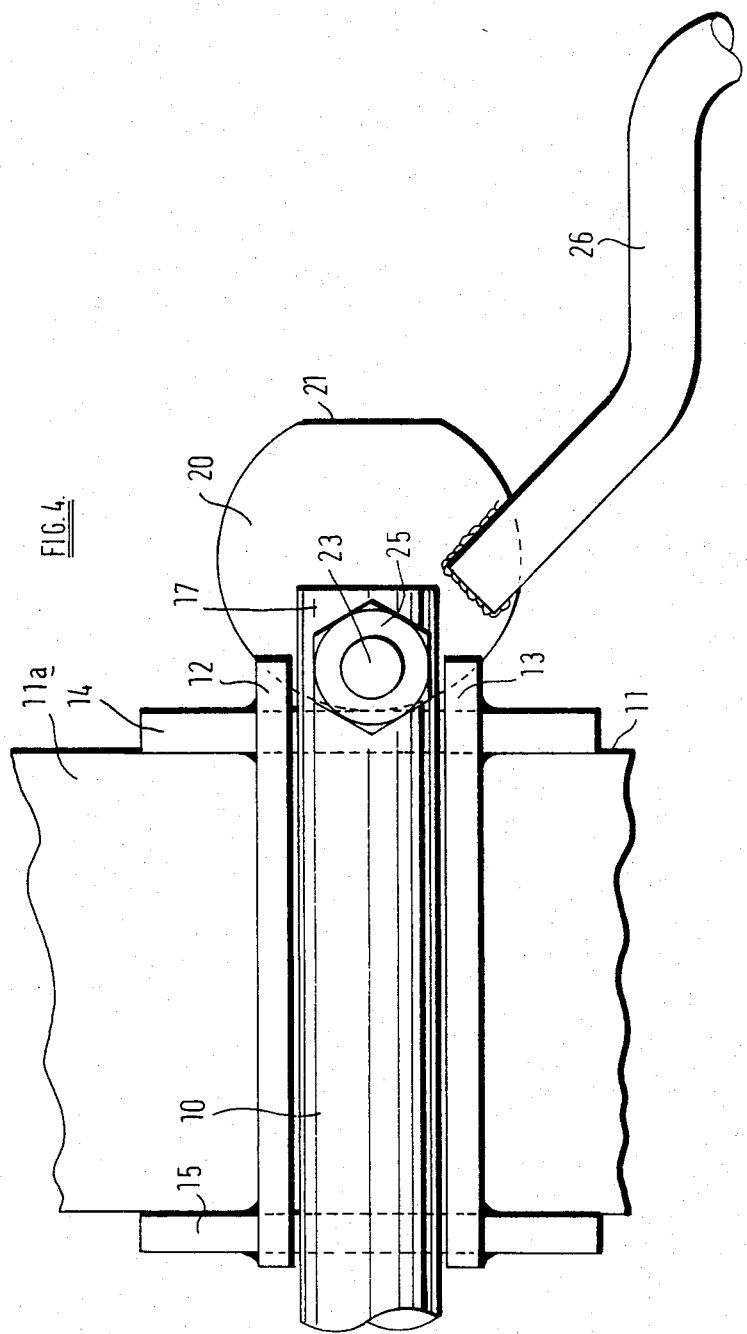

SUPPORTING ASSEMBLY FOR TROUGHING ROLLS OF CONVEYOR BELTS

DESCRIPTION

The present invention relates to improvements in conveyor systems and especially to improvements in the manner of mounting idler roller assemblies in such systems.

Despite all efforts to prevent ingress of water, dirt and dust into the bearings on which idler rollers are mounted for rotation such substances, nevertheless, gain entry and frequently cause bearing failure. Such failure may result in overheating of the bearing affected to the extent that a fire is caused, an especially serious hazard when the conveyor is being used underground, for example in a coal mine.

Bearing failure generally requires that the conveyor line be halted until the affected idler roller assembly has been replaced.

We have now developed a means of mounting at least one of the two outer idler rollers in an idler roller assembly in such a manner that in the event of bearing failure, or iminent failure, the affected roller can be quickly and easily removed to a position out of contact with the conveyor belt, thereby preventing further wear on the bearing and making the rollers easily available for replacement without the need to halt the conveyor line.

Accordingly, therefore, the present invention provides an idler roller assembly in a conveyor system consisting of at least two rollers in a V or trough formation mounted in the conveyor frame, on shafts extending outwardly from the outer rollers thereof, for movement between an operative position in which the rollers support the conveyor belt and an inoperative position in which the said rollers no longer support the conveyor belt, wherein at least one of the said shafts is supported in the conveyor frame by support means including means for moving the said idler roller assembly between the operative and inoperative positions.

The said second means preferably includes a member mounted at one end of the said shaft for rotation about an eccentric axis, which member co-operates with the said frame and/or support means such that in a first position the assembly is maintained in the operative position and in a second position the assembly is in the inoperative position, the said member including a third means, such as a handle, for effecting movement between the said first and second positions.

The said member may be a disc pivotally mounted offcentre and in a plane substantially parallel to the axis of the said shaft, preferably having a flat portion at right angles to the diameter on which the mounting is located. The disc may, of course, have a plurality of flat portions, for example it may be hexagon shaped.

The supporting means for the shaft may include elements adjacent the said frame providing a channel in which the shaft is located to position the assembly relative to the conveyor line, and within the said shaft is free to move.

One embodiment of the invention will now be more fully described with reference to the accompanying diagrammatic drawings in which:

FIG. 1 is an illustration of the end of one shaft supporting an outer roller of an idler roller assembly when the said assembly is in the operative position, FIG. 2 is a part section along line A—A of FIG. 1, FIG. 3 is a representation of a part section through the conveyor with the idler assembly in the operative position, FIG. 4 is an illustration of the end of one shaft supporting an outer roller with the idler roller assembly in the inoperative position, FIG. 5 is a representation of a part section through a conveyor with the idler roller assembly in the inoperative position.

Referring to the drawings. An idler roller assembly shown in part section in FIGS. 3 and 5 includes two outer rollers 1 (one only shown) and a centre roller 2. One end of roller 2 is supported on a shaft 3 by a roller bearing (not shown) located within the roller. The inner end of the roller 1 is likewise supported on a shaft 4 by a roller bearing (not shown) located within the roller. Shafts 2 and 4 are coupled through a bolt arrangement 5 about which both shafts are free to pivot.

The opposite end of roller 2 is similarly supported and the supporting shaft coupled to a shaft supporting the inner end of the second outer roller so that roller 2 is effectively slung between the two outer rollers 1.

The outer end of outer roller 1 is supported on a shaft 10 by a roller bearing (not shown) located within the roller. The said shaft 10 is in turn supported by conveyor frame member 11 extending lengthwise of the conveyor having a channel section with an upper supporting surface 11a angled to the horizontal so that when the assembly is in the operative position, whown in FIG. 3 the shaft is supported by the upper end portion only of surface 11a.

Elements 12 and 13 are welded onto the inner sides of U-shaped supports 14 and 15 bolted onto frames 11 to provide a channel in which the shaft 10 can be located in order to achieve correct positioning of the assembly in relation to the run of the conveyor. Elements 12 and 13 are spaced sufficiently far apart to permit easy movement of shaft 10 along and out of the said channel provided thereby.

A disc 20 having a flat 21, is pivotally mounted on end 17 of shaft 10 by a nut and bolt arrangement, 22. A bolt 23 passes through disc 20 at a position adjacent the circumference thereof and on a diameter at right angles to the flat 21. The head of bolt 23 is welded onto disc 20 so that the bolt and disc are mutually rotatable. Bolt 23 then passes through hole 24 drilled in shaft 10 and is rotatable therein being retained by self-locking nut 25 which is tightened sufficiently to maintain disc 20 substantially parallel to shaft 10. A cranked handle 26 is welded onto the top of disc 2.

The opposite outer roller is conventionally supported in an identical locating channel. However, if required, the mounting may also include a disc arrangement as described above.

The dimensions of the disc 20 and position of hole 24 in shaft 10 are arranged such that, when flat 21 of disc 20 engages support 14, thus locking the disc in position, the idler roller assembly supports the conveyor belt 18 as shown in FIG. 3 and is in the operative position. As previously noted shaft 10 is supported by the upper side of surface 11a of frame 11.

In the event of a bearing failure the handle 26 may be moved to the position shown in FIG. 4 thus causing the disc 20 to rotate about its pivotal axis, i.e. for bolt 23 to rotate in hole 24, thus moving flat 21 out of contact with support 14. The weight of the idler roller assembly then causes the shaft 10 to slide through the locating channel until the part of disc 20 adjacent the hole 24 contacts support member 14. Movement of the shaft 10 as described causes rollers 1 and 2 to move out of contact with the conveyor belt 18 and the assembly assumes the inoperative position shown in FIG. 5. In this position the shaft 10 is parallel to and in contact with the flat surface 11a or frame 11.

Because the rollers 1 and 2 are no longer in contact with the belt 18 rotation of the rollers ceases and further wear of the affected bearing is prevented. Also since the rollers are free from the belt the assembly may be readily removed from the frame, by lifting the outer roller shafts 10 out of the locating channels, and replaced by a new unit initially in its inoperative position.

With a new unit in position movement of the handle 26 thereof from the position shown in FIG. 4 to that shown in FIG. 1 then draws the shaft 10 through the locating channel and causes the rollers 1 and 2 to contact and support the conveyor belt 18 thus bringing the assembly into the operative position. The assembly is prevented from rotating in this position, shown in FIG. 3, by engagement of flat 21 with support 14 as previously described.

I claim:

1. An idler roller assembly for supporting a conveyor belt in a trough formation and carried in a conveyor frame, said assembly including two outer rollers supported in said frame on shafts extending outwardly of said rollers, at least one of said shafts being supported in the said frame by a suppor means operable to move said idler roller assembly between an operative position in which said rollers support the conveyor belt and an inoperative position in which the said rollers do not support the conveyor belt, wherein said support means includes elements rigidly secured to the frame and in which the said one shaft is supported against lateral movement by said elements, whereby the said outer roller is positioned substantially normal to the conveyor line; said support means further including a disc member carried at the end of said one shaft for pivotal movement about an eccentric axis between a first position in which the said disc member maintains the said assembly in the operative position and a second position in which the assembly is in the inoperative position; said disc member cooperating with said frame and being provided with means which cooperates with a portion of said support means which is rigidly attached to said frame to resist rotation of said disc in said first position.

2. An idler roller assembly according to claim 1 wherein said disc member lies in a plane substantially parallel to the axis of the said shaft.

3. An idler roller assembly according to claim 2 wherein said rotation resisting means comprises a flat surface forming part of the periphery of the disc member and normal to a diameter passing through said axis, said flat surface being juxtaposed to said frame when the disc member is in the first said position.

4. An idler roller assembly according to claim 1 wherein said elements rigidly secured to the frame provide a channel in which the shaft is carried.

* * * * *